US007969703B2

(12) United States Patent
Tanaka

(10) Patent No.: US 7,969,703 B2
(45) Date of Patent: Jun. 28, 2011

(54) OVERCURRENT PROTECTION CIRCUIT AND VOLTAGE REGULATOR INCORPORATING SAME

(75) Inventor: Shunsei Tanaka, Toyonaka (JP)

(73) Assignee: Ricoh Company, Ltd., Tokyo (JP)

( * ) Notice: Subject to any disclaimer, the term of this patent is extended or adjusted under 35 U.S.C. 154(b) by 117 days.

(21) Appl. No.: 12/319,678

(22) Filed: Jan. 9, 2009

(65) Prior Publication Data

US 2009/0180231 A1 Jul. 16, 2009

(30) Foreign Application Priority Data

Jan. 11, 2008 (JP) ................................ 2008-004142

(51) Int. Cl.
*H02H 3/08* (2006.01)

(52) U.S. Cl. ...................................... 361/93.9; 361/93.7

(58) Field of Classification Search .................... 361/18, 361/93.7–93.9
See application file for complete search history.

(56) References Cited

U.S. PATENT DOCUMENTS

| | | | | |
|---|---|---|---|---|
| 6,011,416 | A * | 1/2000 | Mizuno et al. | 327/108 |
| 2006/0091961 | A1 * | 5/2006 | Briskin et al. | 330/298 |
| 2007/0206338 | A1 * | 9/2007 | Ishino | 361/93.9 |
| 2008/0106152 | A1 * | 5/2008 | Maier | 307/130 |

FOREIGN PATENT DOCUMENTS

| | | |
|---|---|---|
| JP | 2005-196354 | 7/2005 |
| JP | 2005-209007 | 8/2005 |
| JP | 2006-109349 | 4/2006 |
| JP | 2006-350722 | 12/2006 |
| JP | 2007-11709 | 1/2007 |
| JP | 2007-249384 | 9/2007 |
| JP | 2007-249523 | 9/2007 |
| JP | 2007-304716 | 11/2007 |
| JP | 2008-177330 | 7/2008 |
| JP | 2008-199804 | 8/2008 |

* cited by examiner

*Primary Examiner* — Danny Nguyen
(74) *Attorney, Agent, or Firm* — Cooper & Dunham LLP

(57) ABSTRACT

An overcurrent protection circuit includes a current limiter and a status detector, and a voltage regulator includes an output transistor. The output transistor is configured to regulate a voltage input to an input terminal to output a given constant voltage from an output terminal, while passing a current from the input terminal to the output terminal according to a control signal applied thereto. The current limiter reduces the current passed through the output transistor when the passed current exceeds a given current limit. The status detector is configured to generate a status signal indicating operation of the current limiter. A constant voltage regulator incorporating the overcurrent protection circuit is also disclosed.

15 Claims, 5 Drawing Sheets

OVERCURRENT PROTECTION CIRCUIT AND VOLTAGE REGULATOR INCORPORATING SAME

BACKGROUND OF THE INVENTION

1. Technical Field

The present invention relates to an overcurrent protection circuit and a voltage regulator incorporating the same, and more particularly, to an overcurrent protection circuit that prevents excessive current in a constant voltage regulator supplying constant power to electronic equipment, and a voltage regulator incorporating such an overcurrent protection circuit.

2. Discussion of the Background

Overcurrent protection circuits are employed in power supplies to protect electronic components from excessive current. One typical application of overcurrent protection is in a constant voltage regulator, which limits current flow in an active component and load circuitry used therewith.

FIG. 1 is a circuit diagram illustrating a constant voltage regulator 100 incorporating a conventional overcurrent protection circuit.

As shown in FIG. 1, the voltage regulator 100 includes a main circuit formed of a P-channel metal-oxide-semiconductor (PMOS) transistor P101, resistors R101 and R102, a reference voltage generator 101, and an error amplifier 102, as well as an overcurrent protection circuit formed of PMOS transistors P102 and P103, a resistor R103, and N-channel metal-oxide-semiconductor (NMOS) transistors N101 through N104.

Basically, the voltage regulator 100 is a series regulator that regulates a voltage Vin input to an input terminal IN to output a given constant voltage Vout to an output terminal OUT connected to a load circuit, with the overcurrent protection circuit serving to prevent excessive current flow in the output transistor P101 and the load circuit.

In voltage regulation, the resistors R101 and R102 generate a feedback signal Vfb by dividing the output voltage Vout, while the reference voltage generator 101 generates a reference voltage Vref. The error amplifier 102 compares the voltages Vfb and Vref to generate a control signal that drives the gate of the transistor P101. According to the control signal, the output transistor P101 outputs the constant voltage Vout, while passing therethrough a current i101 to output a current iout to the output terminal OUT.

In the overcurrent protection circuit, the transistor P103, having its gate connected to the gate of the transistor P101, conducts a current i102 proportional to the current i101. The transistors N101 through N103 form a current mirror to generate a current i103 that is proportional to the current i102, and therefore, to the current i101 as well.

The current i103 thus generated flows through the resistor R103 to generate a voltage drop thereacross, equal to the product of the current i103 and a given resistance r103 of the resistor R103 according to Ohm's law. As the current i103 varies in proportion to the output current i101, the voltage drop across the resistor R103 drives the gate of the transistor P102, which, having its drain connected to the gate of the output transistor P101, turns off the output transistor P101 upon an overcurrent condition in which the current i101 exceeds a given current limit.

Such overcurrent occurrence and subsequent current limitation is accompanied by a reduction in the output voltage Vout. When the output voltage Vout falls below a given threshold, the transistor N104, having its gate connected to the output terminal OUT, its drain connected to the source of the transistor N103, and its source connected to ground, turns off, thus changing the ratio between the proportional currents i102 and i103.

More specifically, given that the NMOS transistors N101, N102, and N103 have sizes or channel width-to-length ratios n101, n102, and n103, respectively, the ratio of the current i102 to the current i103 is (n101+n103):n102 when the transistor N104 is conductive, and n101:n102 when the transistor N104 is nonconductive. Thus, in response to the output voltage Vout falling below the threshold voltage, the transistor N104 turns off to sharply reduce the current limit to n101/(n101+n103) times its original value.

Such current limit immediately switched according to the output voltage Vout results in the current i101 being maintained substantially constant regardless of whether the load is shorted or partially shorted. Such current limitation is also seen in certain constant power supplies incorporating a foldback current limiter, another typical form of overcurrent protection circuit. For example, there is a constant power supply with a foldback current limiter featuring low power dissipation regardless of whether the load is shorted or partially shorted.

One drawback of the technique depicted in FIG. 1 is that a system or load deriving power from the voltage regulator is not informed of operating status of the overcurrent protection circuit. In particular, monitoring current limitation where the output voltage changes with the output current is difficult, since the current limit can oscillate as the output voltage rapidly changes in response to changes in the limited output current. Such failure to relay and monitor the operating status of the overcurrent protection circuit makes it difficult to diagnose malfunctions in the system powered by the overcurrent-protected voltage regulator.

BRIEF SUMMARY

This disclosure describes a novel overcurrent protection circuit that prevents excessive current flow in a constant voltage regulator.

In an aspect of the disclosure, there is provided an overcurrent protection circuit that includes a current limiter and a status detector, and the voltage regulator includes an output transistor. The output transistor is configured to regulate a voltage input to an input terminal to output a given constant voltage from an output terminal, while passing a current from the input terminal to the output terminal according to a control signal applied thereto. The current limiter reduces the current passed through the output transistor when the passed current exceeds a given current limit. The status detector is configured to generate a status signal indicating operation of the current limiter.

This patent specification further describes a novel constant voltage regulator that incorporates an overcurrent protector.

In another aspect of the present disclosure, there is provided a constant voltage regulator that includes an output transistor, a control circuit, and an overcurrent protection circuit. The output transistor is configured to regulate a voltage input to an input terminal to output a given constant voltage to an output terminal, while passing a current from the input terminal to the output terminal according to a control signal applied thereto. The control circuit is configured to generate the control signal so that a voltage proportional to the output voltage matches a given reference voltage. The overcurrent protection circuit is configured to prevent excessive current flow in the constant voltage regulator, and includes a current limiter and a status detector. The current limiter reduces the current passed through the output transistor when the passed current exceeds a given current limit. The status detector is configured to generate a status signal indicating operation of the current limiter.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF EXEMPLARY EMBODIMENTS

Figure 1:
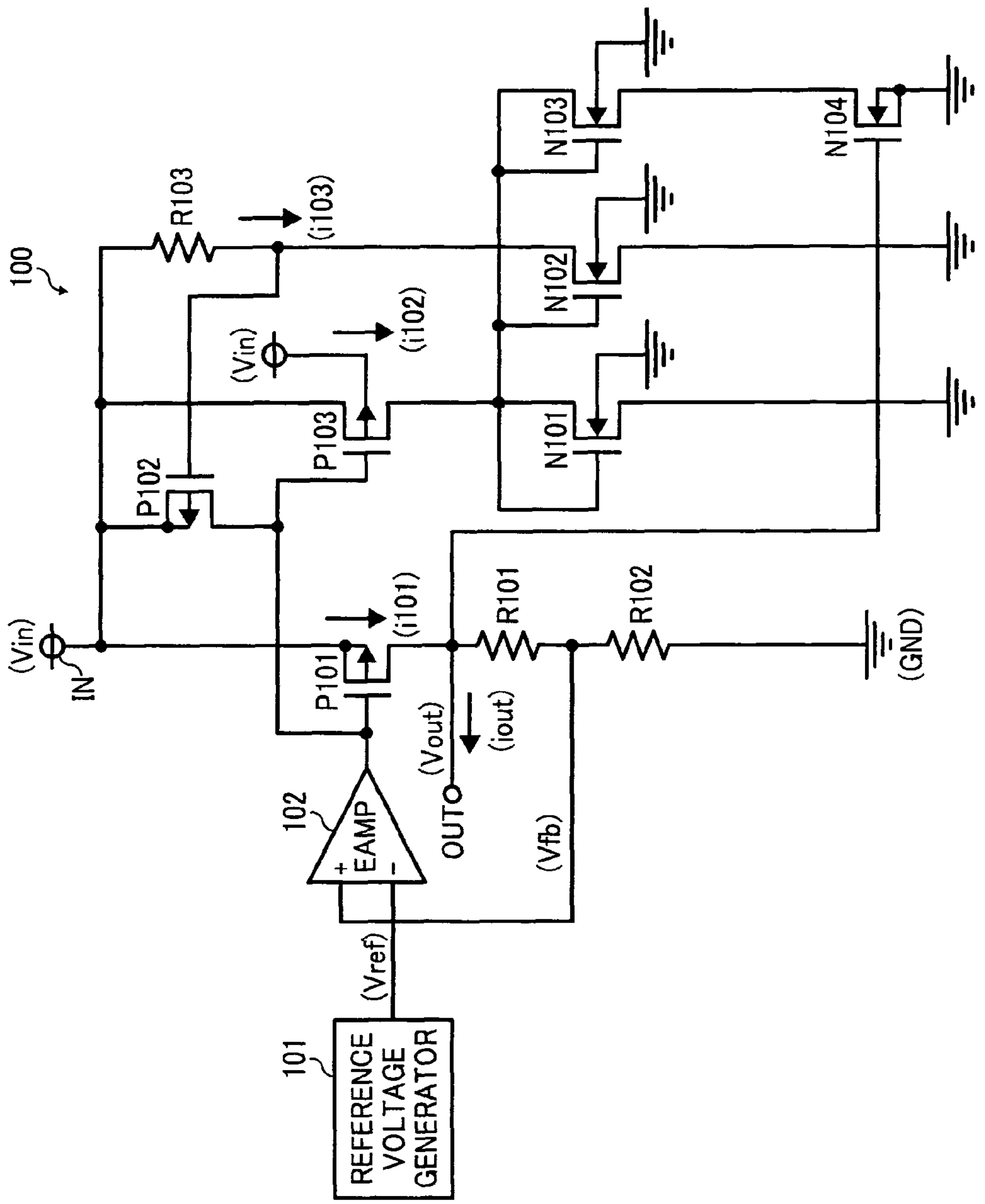
FIG. 1 is a circuit diagram illustrating a constant voltage regulator incorporating a conventional overcurrent protection circuit.

In describing exemplary embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views, examples and exemplary embodiments of this disclosure are described.

Figure 2:
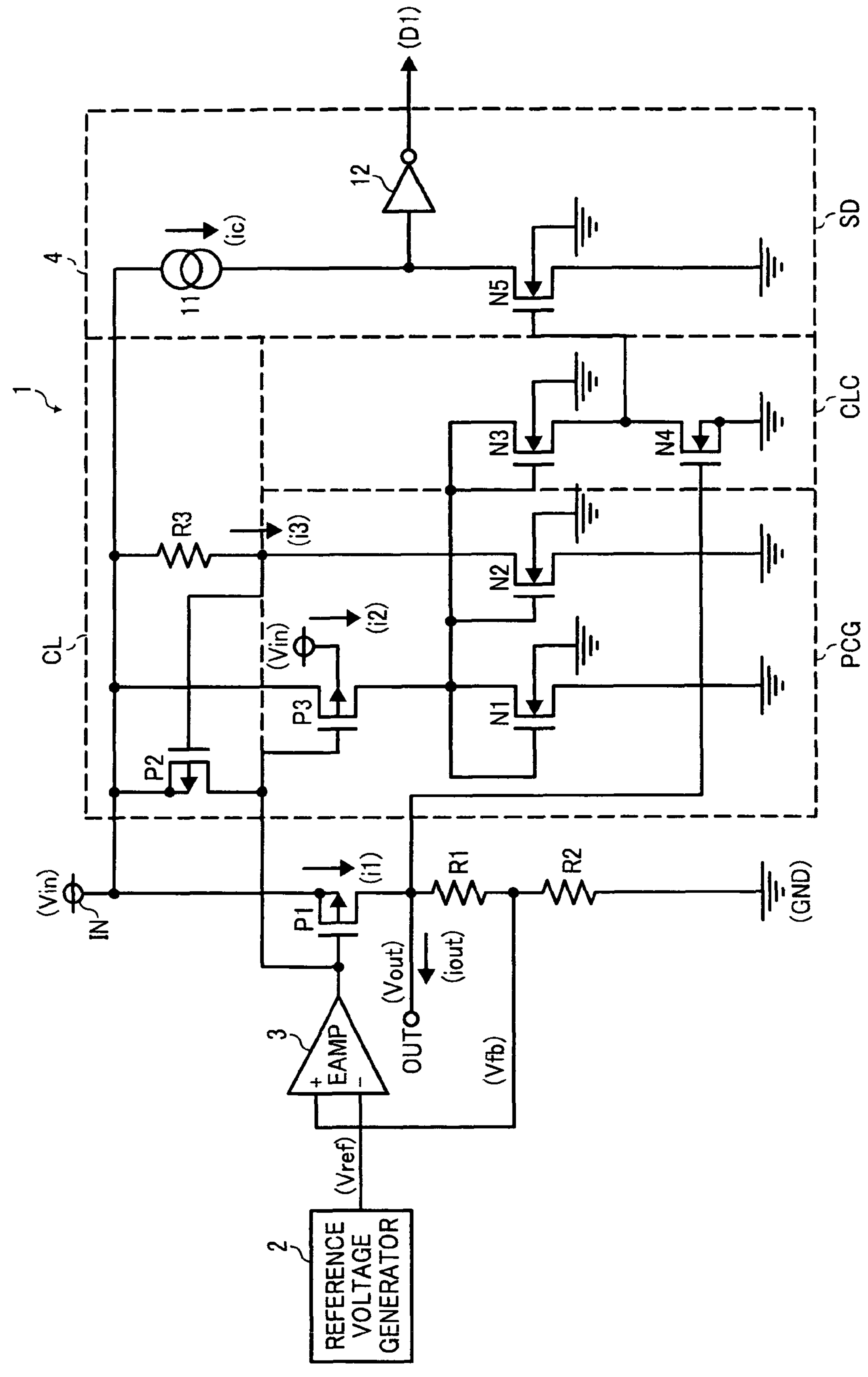
FIG. 2 is a circuit diagram illustrating a constant voltage regulator incorporating an overcurrent protection circuit according to one embodiment of this patent specification.

FIG. 2 is a circuit diagram illustrating a constant voltage regulator 1 incorporating an overcurrent protection circuit 4 according to one embodiment of this patent specification.

As shown in FIG. 2, the voltage regulator 1 includes a P-channel metal-oxide-semiconductor (PMOS) transistor P1, resistors R1 and R2, a reference voltage generator 2, and an error amplifier 3, together forming a main circuit, as well as PMOS transistors P2 and P3, N-channel metal-oxide-semiconductor (NMOS) transistors N1 through N5, a resistor R3, a source 11 of a given constant current ic, and an inverter or NOT gate 12, together forming the overcurrent protection circuit 4.

In the voltage regulator 1, the transistor P1 is connected between an input terminal IN and an output terminal OUT, and the resistors R1 and R2 are connected in series between the output terminal OUT and a ground GND. The error amplifier 3 has a non-inverting input terminal connected to the node between the resistors R1 and R2, an inverting input terminal connected to the reference voltage generator 2, and an output terminal connected to the gate of the transistor P1.

In the overcurrent protection circuit 4, the transistor P2 is connected between the source and the gate of the transistor P1, and between the source and the gate of the transistor P3, so that the transistors P1 and P3 have their gates connected to each other. The resistor R3 is connected between the input terminal IN and the drain of the transistor N2, and the node between the resistor R3 and the transistor N2 is connected to the gate of the transistor P2.

The NMOS transistors N1, N2, and N3 form a current mirror circuit. The transistor N1 is connected in series with the transistor P3 between the input terminal IN and the ground GND, having its gate and drain connected together, and its source connected to the ground GND. The transistor N2 has its source connected to the ground GND and its gate connected to the drain of the transistor N1. The transistor N3 has its gate and drain connected to the drain of the transistor N1.

The transistors N3 and N4 are connected in series with each other, each in parallel with the transistor N1. The transistor N4 is connected between the source of the transistor N3 and the ground GND, having its gate connected to the output terminal OUT. The node between the transistors N3 and N4 is connected to the gate of the transistor N5.

The transistor N5 is connected in series with the constant current source 11 between the input terminal IN and the ground GND. The inverter 12 has an input terminal connected to the node between the constant current source 11 and the transistor N5, and an output for connection to a suitable circuit, not shown.

The substrate gates of all the PMOS transistors are connected to the input terminal IN, and those of all the NMOS transistors are connected to the ground GND. All the components of the voltage regulator 1 may be integrated into a single integrated circuit (IC).

Basically, the constant voltage regulator 1 is a series regulator that regulates a voltage Vin input to the input terminal IN to output a given constant voltage Vout from the output terminal OUT to a load circuit, not shown, wherein the transistor P1 serves as an output device driven by a control circuit formed of the resistors R1 and R2, the reference voltage generator 2, and the error amplifier 3.

In voltage regulation, the resistors R1 and R2 divide the output voltage Vout to output a proportional, feedback voltage Vfb to the non-inverting input terminal of the error amplifier 3, while the reference voltage generator 2 outputs a given reference voltage Vref to the inverting input terminal of the error amplifier 3. Based on the signals Vfb and Vref, the error amplifier 3 generates a control signal to drive the gate of the transistor P1 so that the feedback voltage Vfb matches the reference voltage Vref. According to the control signal applied thereto, the output transistor P1 outputs the constant voltage Vout, while passing therethrough a current i1 to output a current iout to the output terminal OUT.

Connected to the main circuit, the overcurrent protection circuit 4 serves to protect the output transistor P1 and the connected load from excessive current during voltage regulation. Functionally, the overcurrent protection circuit 4 includes a current limiter CL formed of the transistor P2 and the resistor R3, a proportional current generator PCG formed of the transistors P3, N1, and N2, a current limit controller CLC formed of the transistors N3 and N4, and a status detector SD formed of the transistor N5, the constant current source 11, and the inverter 12.

In the overcurrent protection circuit 4, the proportional current generator PCG outputs a current i3 proportional to the current i1 flowing through the output transistor P1. In the proportional current generator PDG, the transistor P3, having its gate connected to the gate of the output transistor P1, passes a current i2 proportional to the current i1. The current mirror formed by the transistors N1 through N3 outputs the current i3 flowing through the transistor N2 by replicating the current i2 flowing through the transistor P3. The current replica i3 thus generated is proportional to the current i2, and therefore, to the current i1 as well.

The current limiter CL limits the current i1 passed through the output transistor P1 below a given current limit iL. In the current limiter CL, the PMOS transistor P2 reduces the current i1 when turned on by a voltage drop across the resistor R3, which is the product of a given resistance r3 of the resistor R3 and the current i3 flowing through the resistor R3. Thus, the current limiter CL is activated when the proportional current i3 is high and corresponds to the current limit iL, indicating an overcurrent condition in which the current i1 flowing through the output transistor P1 exceeds the current limit iL.

Specifically, the current limiter CL remains inactive in the absence of an overcurrent in the output transistor P1, in which the proportional current i3 is relatively small and the transistor P2 remains off. With the transistor P2 thus shut off, the transistor P1 operates according to the control signal generated by the control circuit and outputs the constant voltage Vout.

The current limiter CL is activated upon occurrence of an overcurrent in the output transistor P1, in which the current i3 proportionally increases to turn on the transistor P2. The transistor P2 thus becoming conductive reduces current flow in the transistor P1, thereby limiting the current i1 to the current limit iL so as to protect the transistor P1 and the connected load from excessive current flow.

Such current limitation in response to an overcurrent is accompanied by changes in the output voltage Vout. The current limit controller CLC monitors the output voltage Vout, and changes the level of the current limit iL as the monitored voltage Vout changes due to an overcurrent condition. In the current limit controller CLC, the NMOS transistor N4 changes the ratio between the proportional currents i2 and i3 by switching on and off when the changing output voltage Vout reaches a given threshold voltage V0.

Specifically, with no overcurrent and thus no current limitation taking place, the transistor N4 is on and conducts current as long as the voltage Vout remains above the threshold voltage V0. Given that the NMOS transistors N1, N2, and N3 have sizes or channel width-to-length ratios n1, n2, and n3, respectively, the ratio of the current i2 to the current i3 is (n1+n3):n2 when the transistor N4 is conductive. The result is the current limit iL maintained at a relatively high level for Vout>V0.

When current limitation takes place upon occurrence of an overcurrent so that the output voltage Vout falls below the threshold voltage V0, the transistor N4 shuts off. With the transistor N4 turning off, the current ratio i2:i3 changes from (n1+n3):n2 to n1:n2, immediately reducing the current limit iL. As a result, the level of the current limit iL for Vout≦V0 is n1/(n1+n3) times that for Vout>V0.

In the overcurrent protection circuit 4, the status detector SD serves to generate a binary, status signal D1 indicating operation of the current limiter CL, i.e., whether or not the current limiter CL is activated or not. In the status detector SD, the status signal D1 is output from the inverter 12, which is controlled by the NMOS transistor N5 turning on and off responsive to the transistor N4 switching on and off in the current limit controller CLC.

Specifically, when the transistor N4 is conductive with no current limitation taking place, the transistor N5 is off so that the inverter output D1 remains low, indicating that the current limiter CL is inactive.

When the transistor N4 shuts off as a result of current limitation, the transistor N5 turns on to reduce voltage input to the inverter 12, resulting in the status signal D1 switched from low to high, indicating that the current limiter CL is activated.

Thus, the status detector SD effectively detects operation of the current limiter CL based on the current limit controller CLC switching the proportional current generator PCG from one state to another in response to changes in the output voltage Vout, wherein the status signal D1 indicates activation of the current limiter CL when the proportional current generator PCG switches to lower the current limit iL, and deactivation of the current limiter CL when the proportional current generator PCG switches to raise the current limit iL.

Hence, the voltage regulator 1 and the overcurrent protection circuit 4 according to this patent specification provides overcurrent protection with the status signal D1 indicating activation and deactivation of the current limiter CL, which can be implemented using relatively simple circuit components added to existing circuitry. Such status signaling not only provides a ready indication of operating status of the overcurrent protection circuit 4, but facilitates monitoring of the current limit iL as well as diagnosis of malfunctions in the system deriving power from the voltage regulator 1. In addition, the current limit iL immediately switched in response to changes in the output voltage Vout maintains a constant output current regardless of whether the connected load is shorted or partially shorted to cause an overcurrent condition.

Figure 3:
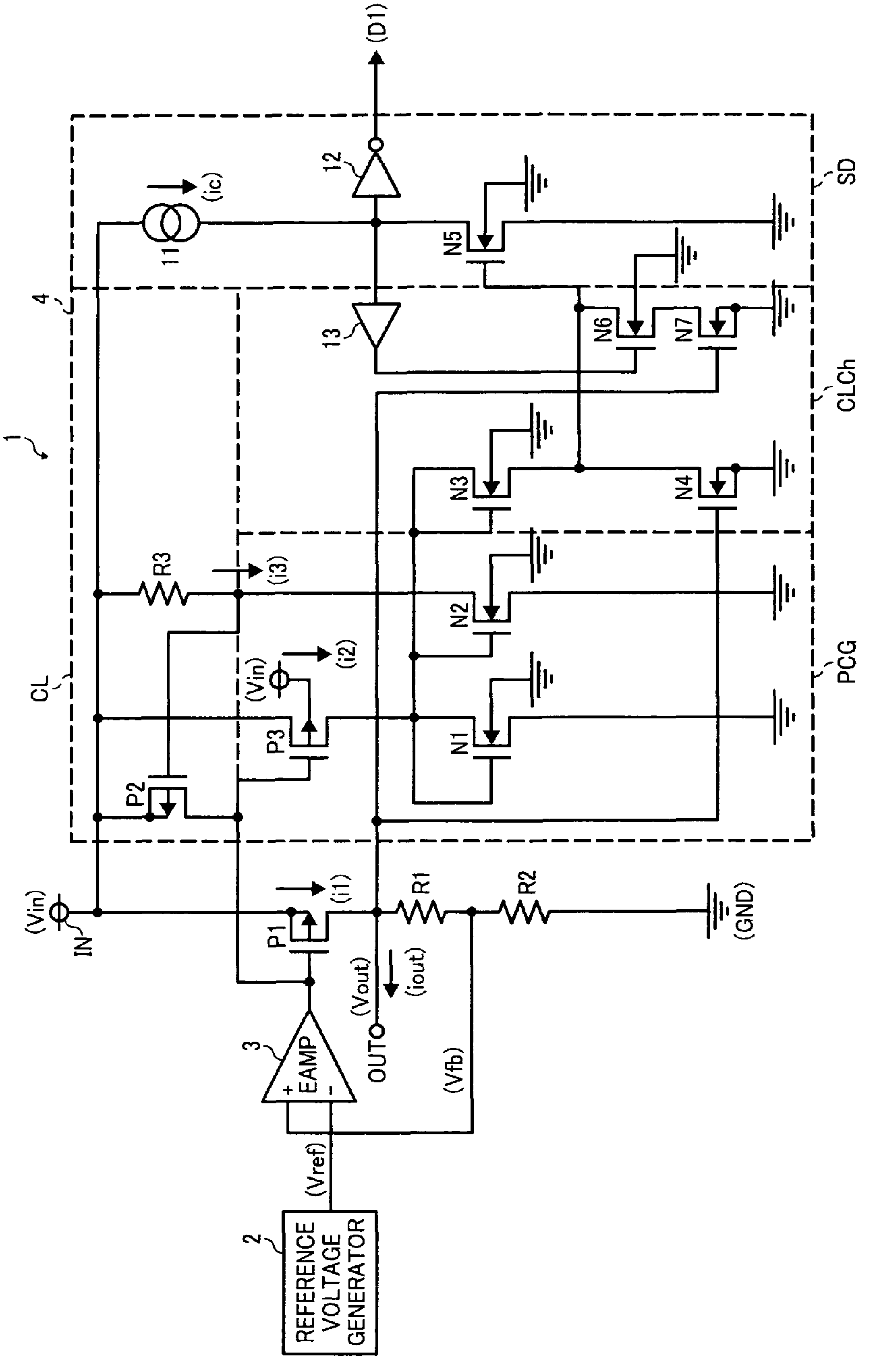
FIG. 3 is a circuit diagram illustrating the voltage regulator incorporating the overcurrent protection circuit according to another embodiment of this patent specification.

Referring now to FIG. 3, a circuit diagram illustrating the voltage regulator 1 incorporating the overcurrent protection circuit 4 according to another embodiment of this patent specification is described.

As shown is FIG. 3, the voltage regulator 1 is similar to that depicted in FIG. 2, except that the overcurrent protection circuit 4 includes a current limit controller CLCh formed of NMOS transistors N6 and N7 and a buffer 13 in addition to the NMOS transistors N3 and N4 included in the current limit controller CLC of FIG. 2. As the general description of the voltage regulator 1 is already given herein, the following will focus on configuration of the current limit controller CLCh and operation of the overcurrent protection circuit 4 related therewith.

In the current limit controller CLCh, the transistors N3 and N4 are connected in the manner depicted in FIG. 2. The transistors N6 and N7 are connected in series between the gate of the transistor N5 and the ground GND. The buffer 13 has an input connected to the node between the constant current source 11 and the transistor N5, and an output connected to the gate of the transistor N6. The gate of the transistor N7 is connected to the output terminal OUT.

In addition, the NMOS transistors N4 and N7, with their gates connected to the output voltage Vout, are constructed with different parameters so that the transistor N4 has a threshold voltage Vth4 greater than a threshold voltage Vth7 of the transistor N7.

During normal operation, in which the status signal D1 is low and the transistor N6 is on, the NMOS transistors N4 and N7 both remain conductive. When the transistor P2 turns on, the output voltage Vout becomes lower, turning off first the transistor N4 with the relatively high threshold Vth4, and then the transistor N7 with the relatively low threshold Vth7. As a result, the current limit iL is switched upon the turn-off of the transistor N7 with the transistor N6 conducting when the current limiter CL is being activated.

After current limitation takes place, in which the status signal D1 is high and the transistor N6 is off, the NMOS transistors N4 and N7 are both shut off. When the transistor P2 turns on to terminate current limitation, the output voltage Vout becomes higher, turning on first the transistor N7 with the relatively low threshold Vth7, and then the transistor N4 with the relatively high threshold Vth4. As a result, the current limit iL is switched upon the turn-on of the transistor N4 with the transistor N6 not conducting when the current limiter CL is being deactivated.

Figure 4A:
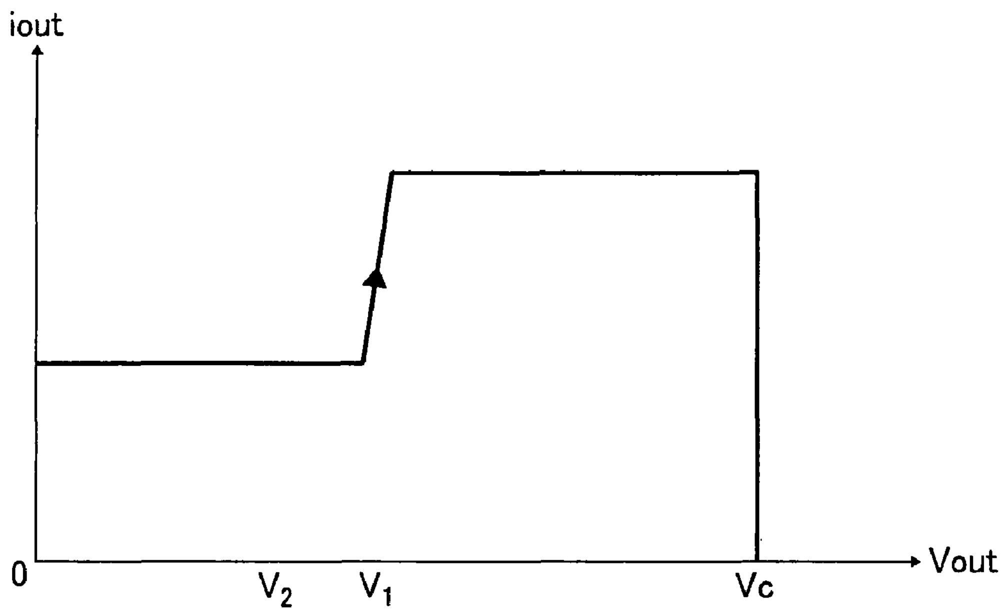
FIGS. 4A and 4B show output current versus output voltage upon deactivation and activation, respectively, of a current limiter in the voltage regulator of FIG. 3.
Figure 4B:
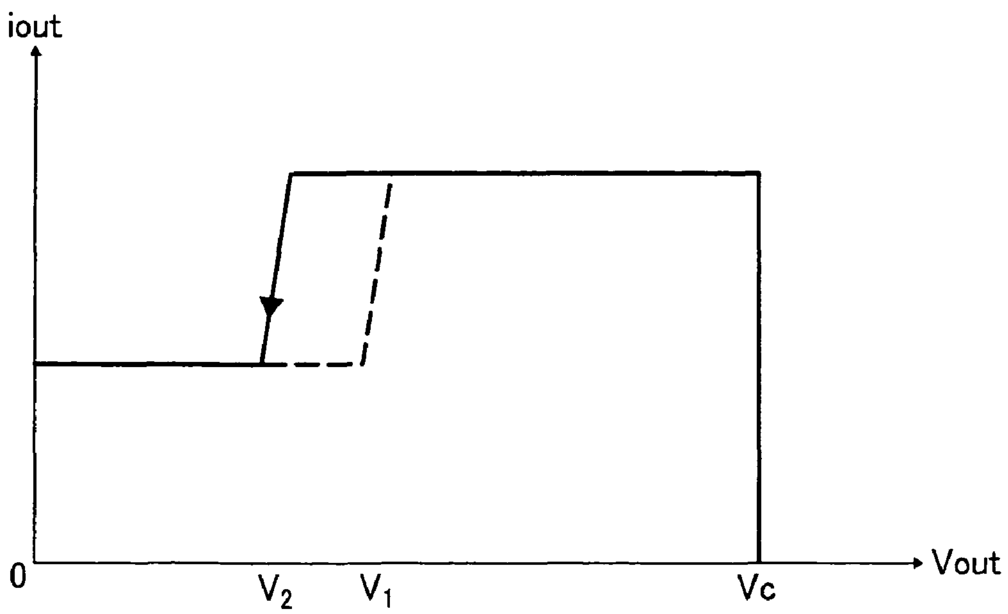

FIGS. 4A and 4B show the output current iout versus the output voltage Vout upon deactivation and activation, respectively, of the current limiter CL in the voltage regulator 1 of FIG. 3.

As shown, when the output voltage Vout increases toward a given constant level Vc upon deactivation of the current limiter CL, the current limit controller CLC switches the current limit iL at a relatively high voltage V1 (FIG. 4A). By contrast, when the output voltage Vout decreases from the constant level Vc upon activation of the current limiter CL, the current limit controller CLC switches the current limit iL at a relatively low voltage V2 (FIG. 4B).

Thus, the current limit controller CLCh exhibits hysteresis in the switching of the current limit iL depending on whether the output voltage Vout exceeds or falls below the threshold voltage. This hysteresis or difference in the output voltage Vout to which the current limit controller CLCh responds in activation and deactivation of the current limiter CL prevents possible failures occurring where the limited output current iout switches from one level to another in the voltage regulator 1.

In further embodiments, the overcurrent protection circuit 4 according to this patent specification may have the current limit switch transistor N4 with the gate connected to the node between R1 and R2 instead of the output terminal OUT, so that the feedback voltage Vfb instead of the output voltage Vout is input to drive the transistor N4.

Figure 5:
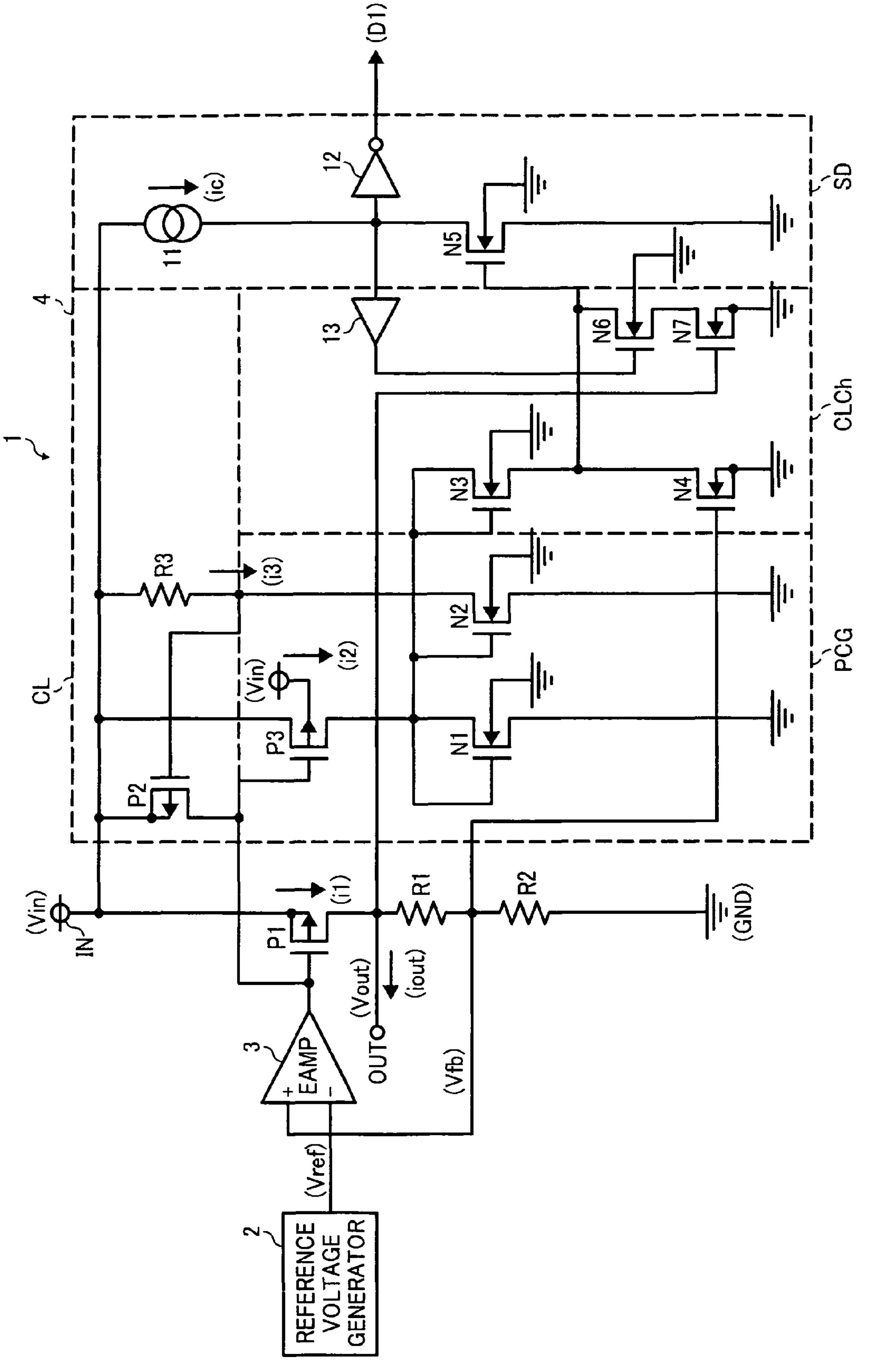
FIG. 5 is a circuit diagram illustrating the overcurrent protection circuit of FIG. 3 configured with a switch transistor connected to a feedback voltage instead of an output voltage.

For example, the overcurrent protection circuit 4 of FIG. 3 may be configured with the switch transistor N4 having its gate connected to the feedback voltage Vfb instead of the output voltage Vout as shown in FIG. 5, in which case the hysteresis as depicted in FIGS. 4A and 4B may be obtained with the NMOS transistors N4 and N7 formed with an identical gate threshold voltage. Such a configuration is also applicable to the circuit 4 of FIG. 2, providing overcurrent protection with operating status detection similar to that described above.

In addition, the overcurrent protection circuit 4 and the voltage regulator 1 according to this patent specification may have an external device to latch the status signal D1. For example, such an external latch may be a non-volatile memory, or one with a backup battery that provides power in the absence of a main power supply, which enables the status signal D1 to remain even after the system is shut down intentionally or accidentally.

Numerous additional modifications and variations are possible in light of the above teachings. It is therefore to be understood that within the scope of the appended claims, the disclosure of this patent specification may be practiced otherwise than as specifically described herein.

This patent specification is based on Japanese patent application No. JP-A-2008-004142 filed on Jan. 11, 2008 in the Japanese Patent Office, the entire contents of which are hereby incorporated by reference herein.

What is claimed is:

1. An overcurrent protection circuit that prevents excessive current flow in a constant voltage regulator, the voltage regulator including:

an output transistor to regulate a voltage input to an input terminal to output a given constant voltage from an output terminal, while passing a current from the input terminal to the output terminal according to a control signal applied thereto, the overcurrent protection circuit comprising:

a current limiter activated to reduce the current passed through the output transistor when the passed current exceeds a given current limit; and a status detector to generate an output signal indicating whether or not the current limiter is activated.

2. An overcurrent protection circuit that prevents excessive current flow in a constant voltage regulator, the voltage regulator including an output transistor to regulate a voltage input to an input terminal to output a given constant voltage from an output terminal, while passing a current from the input terminal to the output terminal according to a control signal applied thereto, the overcurrent protection circuit comprising:

a current limiter to reduce the current passed through the output transistor when the passed current exceeds a given current limit;

a status detector to generate a status signal indicating operation of the current limiter;

a proportional current generator to generate a current proportional to the current passed through the output transistor; and a current limit controller to monitor the voltage output from the output terminal, and to lower the given current limit when a monitored voltage falls below a given threshold voltage, the current limiter being activated when the proportional current reaches a level corresponding to the given current limit, the status detector generating the status signal indicating whether or not the current limit controller lowers the given current limit.

3. The overcurrent protection circuit according to claim 2, wherein the current limit controller switches the proportional current generator from one state to a different state to lower the given current limit from a first level to a second level in response to the monitored voltage falling below the given threshold voltage.

4. The overcurrent protection circuit according to claim 3, wherein the current limit controller switches the proportional current generator from one state to a different state to raise the given current limit to the first level from the second level in response to the monitored voltage exceeding the given threshold voltage.

5. The overcurrent protection circuit according to claim 4, wherein the current limit controller exhibits hysteresis in switching the given current limit between the first and second levels depending on whether the output voltage exceeds or falls below the threshold voltage.

6. The overcurrent protection circuit according to claim 3, wherein the status signal indicates activation of the current limiter when the proportional current generator switches to lower the given current limit.

7. The overcurrent protection circuit according to claim 4, wherein the status signal indicates deactivation of the current limiter when the proportional current generator switches to raise the given current limit.

8. A constant voltage regulator, comprising:

an output transistor configured to regulate a voltage input to an input terminal to output a given constant voltage to an output terminal, while passing a current from the input terminal to the output terminal according to a control signal applied thereto;

a control circuit configured to generate the control signal so that a voltage proportional to the output voltage matches a given reference voltage; and an overcurrent protection circuit configured to prevent excessive current flow in the constant voltage regulator, the overcurrent protection circuit including:

a current limiter activated to reduce the current passed through the output transistor when the passed current exceeds a given current limit; and a status detector to generate an output signal indicating whether or not the current limiter is activated.

9. The constant voltage regulator according to claim 8, wherein the overcurrent protection circuit further includes:

a proportional current generator to generate a current proportional to the current passed through the output transistor; and a current limit controller to monitor the voltage output from the output terminal, and to lower the given current limit when a monitored voltage falls below a given threshold voltage, the current limiter being activated when the proportional current reaches a level corresponding to the given current limit, the status detector outputting the status signal indicating whether or not the current limit controller lowers the given current limit.

10. The constant voltage regulator according to claim 9, wherein the current limit controller switches the proportional current generator from one state to a different state to lower the given current limit from a first level to a second level in response to the monitored voltage falling below the given threshold voltage.

11. The constant voltage regulator according to claim 10, wherein the current limit controller switches the proportional current generator from one state to a different state to raise the given current limit to the first level from the second level in response to the monitored voltage exceeding the given threshold voltage.

12. The constant voltage regulator according to claim 11, wherein the current limit controller exhibits hysteresis in switching the given current limit between the first and second levels depending on whether the output voltage exceeds or falls below the threshold voltage.

13. The constant voltage regulator according to claim 10, wherein the status signal indicates activation of the current limiter when the proportional current generator switches to lower the given current limit.

14. The constant voltage regulator according to claim 11, wherein the status signal indicates deactivation of the current limiter when the proportional current generator switches to raise the given current limit.

15. The overcurrent protection circuit according to claim 1, wherein the output signal of the status detector is a binary output indicating whether the current limiter is activated or not.

* * * * *